United States Patent
Cheng et al.

(10) Patent No.: US 7,764,753 B2
(45) Date of Patent: Jul. 27, 2010

(54) APPARATUS AND METHOD FOR ADAPTIVE WIRELESS CHANNEL ESTIMATION

(75) Inventors: Yong-Hua Cheng, Kaohsiung (TW); Yi-Hung Lu, Kaohsiung (TW); Chia-Ling Liu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 649 days.

(21) Appl. No.: 11/684,585

(22) Filed: Mar. 9, 2007

(65) Prior Publication Data
US 2008/0159458 A1    Jul. 3, 2008

(30) Foreign Application Priority Data
Dec. 29, 2006    (TW) ............... 95149806 A (51) Int. Cl.
*H03D 1/04* (2006.01)
(52) U.S. Cl. .......................................... 375/346
(58) Field of Classification Search ........... 375/233, 375/260, 285, 316, 341, 346, 348, 350, 147, 375/148, 340, 349, 358; 370/203, 206, 208, 370/210, 310, 344, 347, 480
See application file for complete search history.

(56) References Cited

U.S. PATENT DOCUMENTS

| | | | |
|---|---|---|---|
| 6,954,421 B2 | 10/2005 | Kuwabara et al. | 370/203 |
| 7,230,911 B2 * | 6/2007 | Jacobsen | 370/208 |
| 2001/0015954 A1 | 8/2001 | Kuwabara | 370/206 |
| 2005/0129143 A1 * | 6/2005 | Kang et al. | 375/316 |
| 2005/0135324 A1 | 6/2005 | Kim et al. | 370/343 |
| 2005/0286406 A1 * | 12/2005 | Jeon et al. | 370/208 |

FOREIGN PATENT DOCUMENTS

| | | |
|---|---|---|
| DE | 19618561 | 11/1997 |
| EP | 1748610 | 1/2007 |

* cited by examiner

*Primary Examiner*—David C Payne
*Assistant Examiner*—Syed Haider (57) ABSTRACT

An apparatus and method estimates the adaptive wireless channel for a moving vehicle. Once a packet is received, this invention analyzes a channel interference index for the moving vehicle, and computes a first recursive parameter, a second recursive parameter and an interpolation number. Based on the first recursive parameter and the interpolation number, partial channel information is calculated for further channel estimation by using an interpolation. The parameter of an equalizer is also immediately updated. Cooperating with a decision feedback scheme and based on the second recursive parameter, channel tracking is performed. In order to achieve the adaptive channel estimation for wireless access on the time-variant vehicle environment, the parameter for the algorithm for performing the channel estimation is adjusted.

16 Claims, 6 Drawing Sheets

APPARATUS AND METHOD FOR ADAPTIVE WIRELESS CHANNEL ESTIMATION

FIELD OF THE INVENTION

The present invention generally relates to an apparatus and method for adaptive wireless channel estimation, applicable to the wireless access on vehicle environment.

BACKGROUND OF THE INVENTION

The recent rapid growth in wireless communication adds the mobility to information services. However, for the vehicles traveling at high speed, such as cars and rapid railway, the service similar to wireless local area network (WLAN) is still not available. The transportation safety mechanism is one of the major issues in the car market. As more and more electronic technologies, such as global positioning system (GPS) and reverse radar, become the standard options for most vehicles, the safer and inexpensive collision prevention mechanism is becoming the next wave for market competition.

The general communication environment is moving from the pedestrian towards the vehicles in three directions. The first is the telematics service, such as remote diagnostics, which requires the cart to be connected to the back-end server for transmitting and receiving information to access network resources. The second is the communication for connecting one car to another for exchanging the sensed data and information, and exchanging the information between a car and an infrastructure, such as electronic toll, and inter-vehicle warning communication. The third is to provide connection of portable devices with the vehicle so that the vehicle information can be easily transmitted to the portable devices.

The global vehicle telematics service can be provided with the help of the wide-coverage 3G wireless communication or GPS. The stationary or low speed connection of portable devices to the network can be accomplished by the hotspot or the fixed WLAN access.

Figure 1:
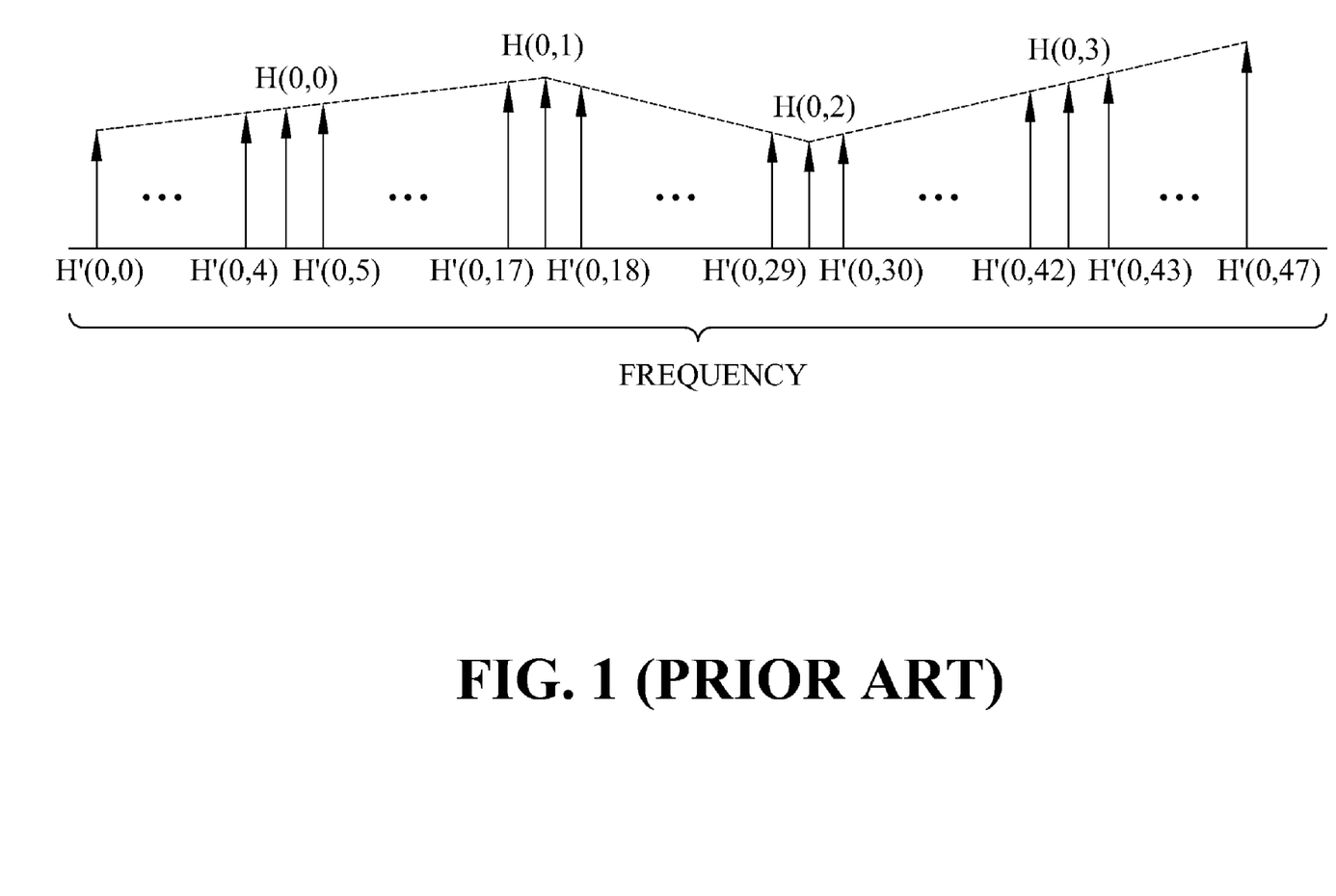
FIG. 1 shows a schematic view of a conventional channel estimation method of the receiver device.

U.S. Pat. No. 6,954,421 disclosed an orthogonal frequency division multiplexing (OFDM) receiver device. FIG. 1 shows a schematic view of a channel estimation method of the receiver device. As shown in FIG. 1, the receiver device uses four pilot signals for four-point channel estimation values. The linear interpolation is performed on the channel estimation values at these four points $H(0,0)$-$H(0,3)$ to obtain the channel estimation values $H'(1,0)$-$H'(47,0)$ of a full transmission path, and the equalizer parameter is updated in real time to improve the channel estimation performance.

In the multi-path time-variant channel, the linear interpolation on four-point channel estimation can cause the resolution to drop as the interpolation range is large, which further results in the large estimation error, and the time-variant compensation effect deteriorates. The stability of wireless network access for high speed vehicles is poor when applying this method.

The major obstacle of the current wireless communication technology to overcome is how to apply the WLAN concept to the inter-vehicle communication and the communication for access points between vehicle and roadside, so that the vehicle has the inexpensive data communication functionality and can form a moving short-distance LAN for promoting driving safety and providing warning messages. The technology barrier is the signal detection and decoding at high speed because the estimation and decoding difficulties increase due to the time-variant channel effect caused by high Doppler frequency. The solution will require the synchronization, channel equalization and estimation, decoding mechanism to form an efficient combination to reduce the cost.

SUMMARY OF THE INVENTION

The examples of the present invention may provide an apparatus and method for adaptive wireless channel estimation, applicable to a moving vehicle in a time-variant environment. The apparatus utilizes the existing basic structure and specification to provide a new adaptive channel tracking mechanism to estimate and compensate the time-variant channel.

The adaptive wireless channel estimation apparatus comprises a decision feedback channel tracking unit, a pilot-aided channel tracking module, and an adaptive controller.

The present invention performs the interpolation on the channel estimation information of the pilot signal and the channel estimation information of the feedback signal. Then, a recursive computation is performed and the equalizer parameter is updated. The decision feedback is further used for tracking time-variant channel, and the algorithm parameter can be adaptively adjusted for moving vehicle time-variant environment so as to achieve the adaptive wireless channel estimation.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 2:
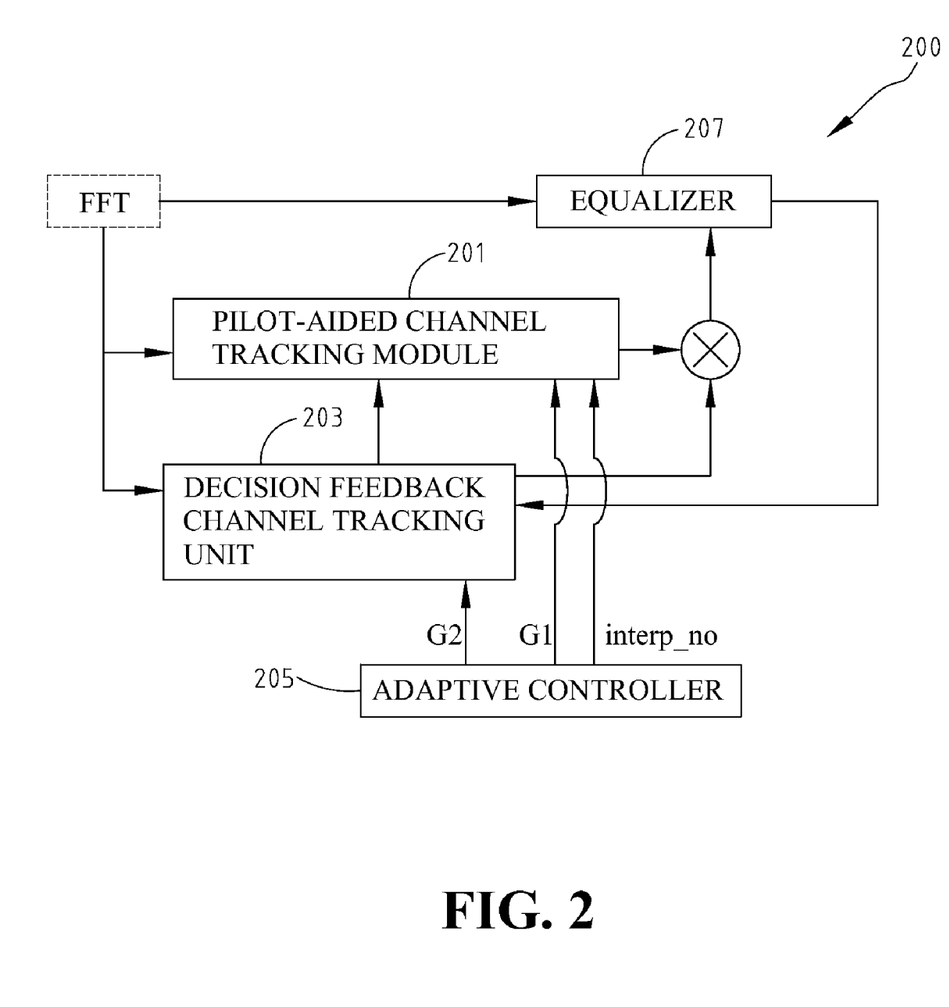
FIG. 2 shows a schematic view of an apparatus for adaptive wireless channel estimation according to the present invention.
Figure 3:
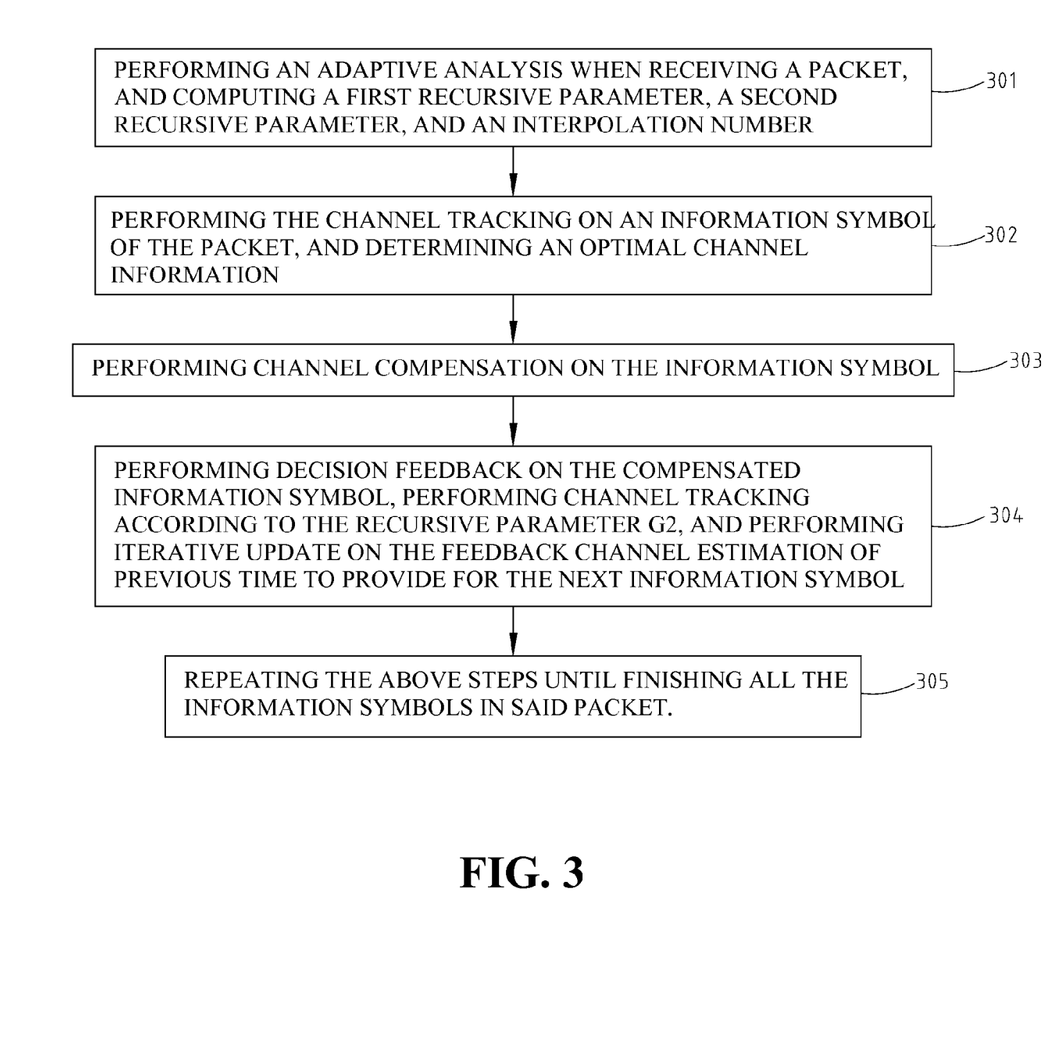
FIG. 3 shows a flowchart illustrating the operation of the apparatus for adaptive wireless channel estimation of FIG. 2.

FIG. 2 shows a schematic view of an apparatus for adaptive wireless channel estimation according to the present invention. As shown in FIG. 2, an apparatus 200 for adaptive wireless channel estimation comprises a pilot-aided channel tracking module 201, a decision feedback channel tracking unit 203 and an adaptive controller 205. The outputs of the pilot-aided channel tracking module 201 and the decision feedback channel tracking unit 203 are combined and then sent to an equalizer 207. FIG. 3 shows a flowchart illustrating the operation of the apparatus for adaptive wireless channel estimation of FIG. 2.

The apparatus for wireless channel estimation is applicable to a moving vehicle in a time-variant environment, such as wireless access on a vehicle environment. In other time-variant wireless access environment, an OFDM-based system can also use the adaptive channel estimate apparatus to improve the reliability of channel information.

The following describes the operating flow of FIG. 3 in conjunction with FIG. 2. When a packet is received, the first step is to initialize the channel estimation. Then, the adaptive controller 205 performs an adaptive analysis and calculates a first recursive parameter G1, a second recursive parameter G2, and an interpolation number interp_no, as shown in step 301. The adaptive controller 205 targets the channel interference index, such as the environmental signal-to-noise ratio (SNR) and the speed of the moving vehicle, to perform adaptive analysis. Based on the first recursive parameter G1 and interpolation number interp_no, the pilot-aided channel tracking module 201 performs the channel tracking on an information symbol of the packet, and determines an optimal channel information, as shown in step 302.

In step 302, an interpolation is performed on a plurality of pilot-aided channel estimations and a plurality of feedback channel estimations at previous time to obtain a plurality of partially updated channel information, to adjust the optimal channel information through the first recursive parameter G1, and to update the parameter of the equalizer 207 in real time.

The updated equalizer 207 performs channel compensation on the information symbol, as shown in step 303. In step 303, the updated equalizer 207 refers to a plurality of partially updated channel information and a signal in frequency axis f obtained from the pilot-aided channel tracking to perform channel compensation. The signal in frequency axis f(n) can be signals transformed by a Fast Fourier Transform (FFT) processing unit.

The decision feedback tracking unit 203 performs decision feedback on the compensated information symbol, performs channel tracking according to the recursive parameter G2, and performs iterative update on the feedback channel estimation of previous time to provide for the next information symbol, as shown in step 304.

The above steps are repeated until all the information symbols in the packet are processed, as shown in step 305, and the process proceeds to the next received packet.

When the interpolation is performed in step 302, if the information symbol in the packet is the first information symbol, the estimated channel information and pilot information obtained from the long preamble are used in the interpolation. The subsequent symbols use the channel estimation values of decision feedback and the pilot information for interpolation.

It is worth noting that the pilot channel estimation values obtained by the symbols can be estimated in several ways, such as least mean square (LMS). Then, the adjustment of the optimal channel information can be performed according to the recursive parameter determined by the environmental quality.

In transmitting the packet, the speed of moving vehicle and the environmental SNR are the indicators regarding whether the transmitted signals are prone to channel interference. For example, when the moving vehicle moves at a higher speed, and the environmental SNR is lower, the channel changes more drastically. Therefore, the channel estimation error will increase. Hence, recursive parameters G1, G2 should be tuned down and the interpolation number should be reduced.

Figure 4:
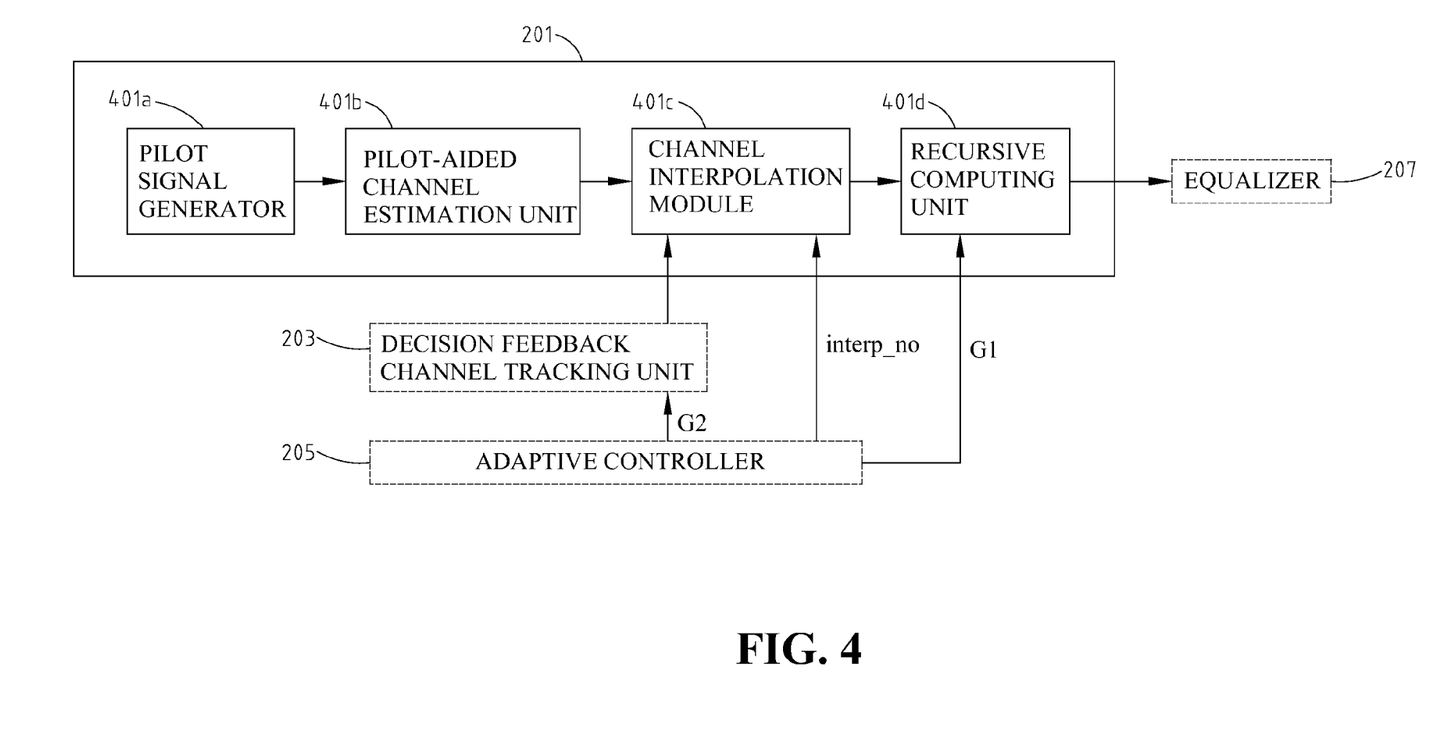
FIG. 4 shows the detailed structure of each element of the pilot-aided channel tracking module and the operation process thereof.

FIG. 4 shows the detailed structure of each element of the pilot-aided channel tracking module and the operation process thereof. As shown in FIG. 4, the pilot-aided channel tracking module 201 includes a pilot signal generator 401a, a pilot-aided channel estimation unit 401b, a channel interpolation module 401c, and a recursive computing unit 401d. The operation of pilot-aided channel tracking module 201 is as follows. The pilot signal generator 401a extracts a plurality of pilot signals from each information symbol to provide to pilot-aided channel estimation unit 401b. Based on the pilot signals, the pilot-aided channel estimation unit 401b performs a plurality of channel estimations. Then, based on interpolation number interp_no, the channel estimations by pilot-aided channel estimation unit 401b, and the channel information of previous time estimated by the decision feedback channel tracking unit 203, the channel interpolation module 401c performs an interpolation to obtain a plurality of partially update channel information. Finally, the recursive computing unit 401d uses LMS to adjust the optimal channel information by using the pilot-aided channel estimation values from two successive information symbols and the recursive parameter G1 determined by the environmental quality.

The adjusted optimal channel information is provided to the equalizer 207 for updating parameter in real time. The interpolation number interp_no can also be adjusted according to the environment. The updated equalizer 207 performs channel compensation on the information symbol.

Figure 5:
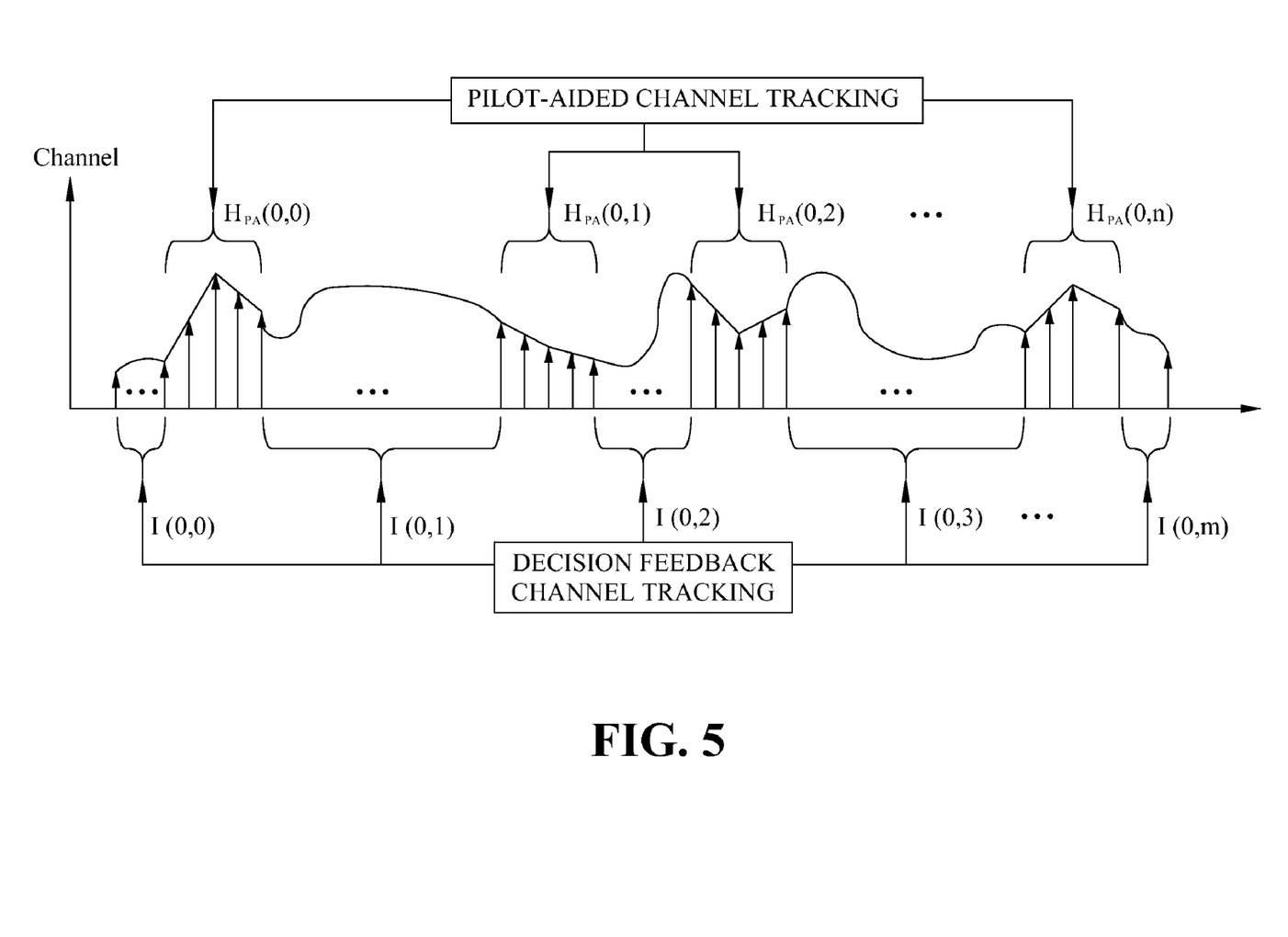
FIG. 5 shows an example illustrating the channel estimation method used by the apparatus of the present invention.

FIG. 5 shows an example illustrating the channel estimation method used by the apparatus of the present invention. As shown in FIG. 5, the present invention uses a plurality of pilot signals for multi-point channel estimation, and uses the pilot-aided channel estimation values $H_{PA}(0,0)$–$H_{PA}(0,n)$ and the feedback signal channel estimation values $I(0,0)$–$I(0,m)$ for interpolation to obtain the channel estimation values of a full transmission path, including using an algorithm in channel estimation, adjusting algorithm parameter, updating equalizer parameter, channel compensation, and combining the channel estimation information from decision feedback.

Because the present invention uses pilot-aided channel estimation values and feedback signal channel estimation values for interpolation, the interpolation range shrinks and resolution increases. Combining decision feedback channel estimation also increases the channel estimation precision. Furthermore, for the time-variant vehicle environment, the present invention adaptively adjusts the algorithm parameter to improve the time-variant channel tracking. The present invention is also stable when applied to the wireless network access in a high speed vehicle environment.

In comparison with the conventional channel estimation method of FIG. 1, the present invention has a smaller estimation error in multi-path time-variant channel estimation, the better frequency selection, and better adaptation to vehicle environment.

Figure 6:
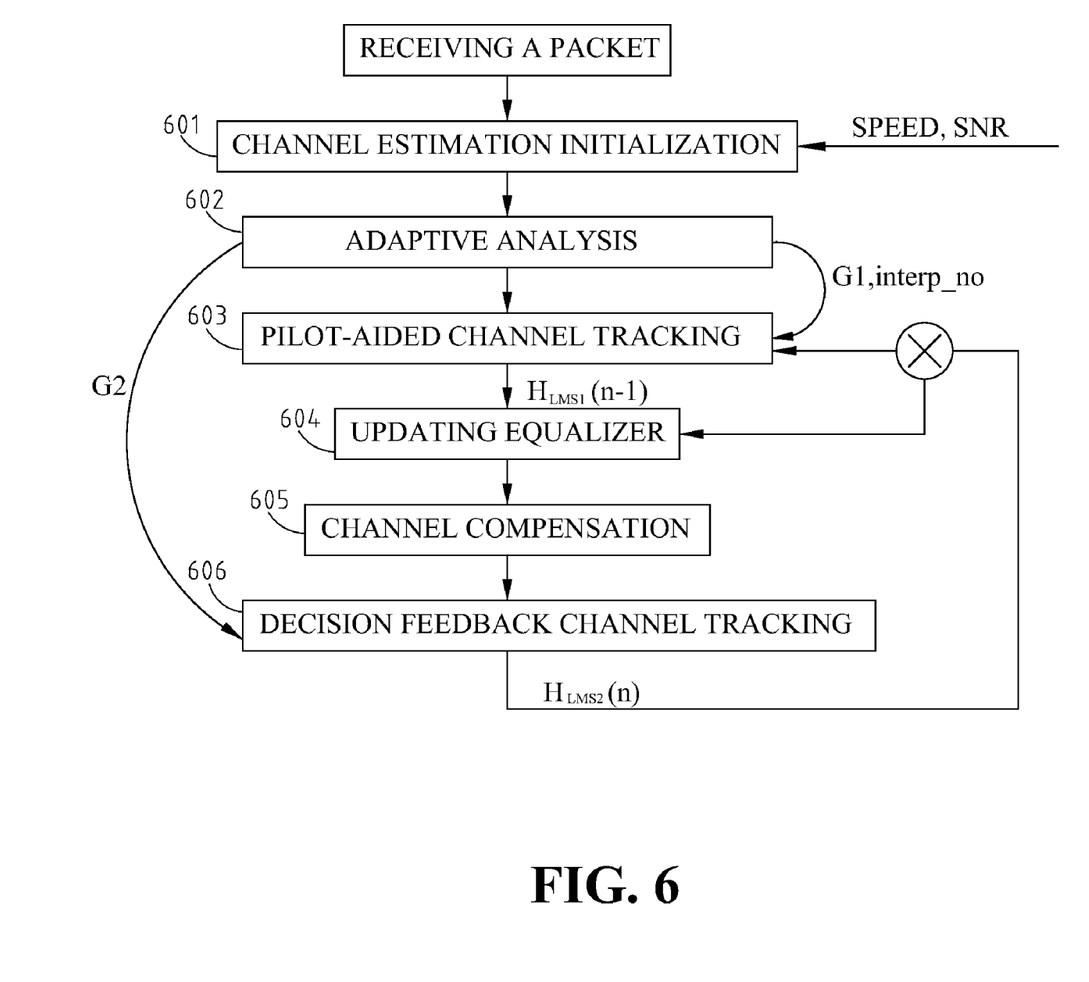
FIG. 6 shows the operating for the adaptive channel estimation of the present invention cooperating with an equalizer after receiving a packet.

In summary, FIG. 6 shows the adaptive channel estimation operation of the present invention cooperating with an equalizer after receiving a packet. As shown in FIG. 6, step 601 is to perform channel estimation initialization after receiving a packet. As aforementioned, when the information symbol of the packet is the first information symbol, the channel information and pilot-aided information obtained by long preamble are used for interpolation. This detail is omitted from FIG. 6.

The subsequent information symbols use decision feedback channel estimation and pilot-aided information for interpolation. The subsequent information symbols also cooperate with the equalizer in adaptive channel estimation.

The adaptive controller 205 performs an adaptive analysis 602 for the speed of moving vehicle and the environmental SNR. The adaptive analysis 602 calculates the first recursive parameter G1, the second recursive parameter G2, and the interpolation number interp_no. The first recursive parameter G1 and the interpolation number interp_no are provided to the pilot-aided channel tracking module 201 for pilot-aided channel tracking 603, and the second recursive parameter G2 is provided to the decision feedback channel tracking unit 203 for decision feedback channel tracking 606.

In the pilot-aided channel tracking 603, the pilot signal generator 401a extracts pilot-signals from each information symbol, and the pilot signals are used for detailed channel estimation. Because pilot signals have certain characteristics, the channel estimation is accomplished with certain precision. Based on the pilot signals, the pilot-aided channel estimation unit 401b performs channel estimations. Based on interpolation number interp_no, the pilot-aided channel estimations of the current information symbol from the pilot-aided channel estimation unit 401b, and the channel information of previous time from the decision feedback channel tracking unit 203, the channel interpolation module 401c performs an interpolation to obtain a plurality of partial update channel information $H_{pA1}(n)$. As aforementioned, the recursive computing unit 401d uses LMS to adjust the optimal channel information $H_{LMS1}(n)$ by using the pilot-aided channel estimation from two successive information symbols and the recursive parameter G1 determined by the environmental quality. That is, $H_{LMS1}(n)=H_{pA1}(n)*G1+H_{pA1}(n-1)*(1-G1)$.

In the decision feedback channel tracking 606, the decision feedback tracking unit 203 uses decision feedback symbol as the training symbol to perform frequency domain response on channel, and uses LMS to iteratively update channel estimation values $H_{new}(n)$ and $H_{new}(n-1)$. Each information symbol is executed once. In LMS algorithm, the recursive parameter G2 is generated by the adaptive controller 205. In other words, after using LMS for iterative update of channel estimation values, the adjusted channel estimation value is $H_{LMS2}(n)$, where $H_{LMS2}(n)=H_{new}(n)*G2+H_{new}(n-1)*(1-G2)$.

The present invention uses channel estimation $H_{LMS2}(n)$ that is iteratively updated by the decision feedback channel tracking unit 203 and the optimal channel information $H_{LMS1}(n)$ that is adjusted by the pilot-aided channel tracking module 201 to perform the equalizer update 604. That is, the parameter of equalizer 207 is updated in real time. The updated equalizer 207 performs channel compensation on information symbols.

The decision feedback channel tracking unit 203 performs decision feedback on the compensated information symbol, and performs channel tracking based on the recursive parameter G2. The updated channel estimation $H_{LMS2}(n)$ is provided to the next information symbol.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for adaptive wireless channel estimation, applicable to a moving vehicle time-variant environment, said apparatus comprising:
    an adaptive controller, for performing an adaptive analysis when receiving a packet, and computing a first recursive parameter, a second recursive parameter, and an interpolation number;
    a pilot-aided channel tracking module receiving said first recursive parameter and said interpolation number from said adaptive controller, for estimating pilot-aided channel information and performing an interpolation to obtain updated channel information based on the estimated pilot-aided channel information, feedback channel estimation information of previous time and said interpolation number, and for adjusting an optimal channel information through said first recursive parameter; and
    a decision feedback channel tracking unit receiving said second recursive parameter from said adaptive controller and sending said feedback channel estimation information of previous time to said pilot-aided channel tracking module, for performing decision feedback on a compensated information symbol, for performing channel tracking based on said second recursive parameter, for iteratively updating said feedback channel estimation information of previous time, and for providing iteratively updated channel estimation information to a next information symbol.

2. The apparatus as claimed in claim 1, wherein said moving vehicle time-Variant environment is a vehicle time-variant wireless access environment.

3. The apparatus as claimed in claim 1, wherein said apparatus is applicable to an orthogonal frequency division multiplexing (OFDM)-based system in a wireless access environment.

4. The apparatus as claimed in claim 1, wherein said adaptive controller performs adaptive analysis for one or more channel interference indexes.

5. The apparatus as claimed in claim 1, wherein said pilot-aided channel tracking module and said decision feedback channel tracking unit are connected to an equalizer.

6. The apparatus as claimed in claim 5, wherein said equalizer updates an equalizer parameter based on the adjusted optimal channel information from said pilot-aided channel tacking module and said iteratively updated channel estimation information from said decision feedback channel tracking unit.

7. The apparatus as claimed in claim 1, wherein said pilot-aided channel tracking module further comprises:
    a pilot signal generator, for extracting at least a pilot signal from each information symbol;
    a pilot-aided channel estimation unit, for performing multi-point channel estimation based on said at least a pilot signal and generating said estimated pilot-aided channel information;
    a channel interpolation module, for performing said interpolation to obtain said updated channel information based on said interpolation number, said estimated pilot-aided channel information, and said feedback channel estimation information of previous time from said decision feedback channel tracking unit; and
    a recursive computing unit, to adjust said optimal channel information based on said estimated pilot-aided channel information of two successive information symbols and said first recursive parameter.

8. A method for adaptive wireless channel estimation, applicable to a moving vehicle time-variant environment, said method comprising the steps of:
    performing an adaptive analysis when receiving a packet, and computing a first recursive parameter, a second recursive parameter, and an interpolation number;
    performing pilot-aided channel tracking on an information symbol by estimating pilot-aided channel information and performing an interpolation to obtain updated channel information based on the estimated pilot-aided channel information, feedback channel estimation information of previous time and said interpolation number, and determining an optimal channel information through said first recursive parameter;

performing channel compensation on said information symbol;

performing decision feedback on a compensated information symbol by providing said feedback channel estimation information of previous time, performing channel tracking based on said second recursive parameter, for iteratively updating said feedback channel estimation information of previous time, and providing iteratively updated channel estimation information to a next information symbol; and repeating the above steps until all information symbols in said packet are processed.

9. The method as claimed in claim 8, wherein said interpolation is performed by using channel information and one or more pilot signals from long preamble of said packet.

10. The method as claimed in claim 8, wherein the step of performing pilot-aided channel tracking on said information symbol further includes the step of:

performing an interpolation through a plurality of pilot-aided channel estimations and a plurality of feedback channel estimations at previous time, obtaining updated channel information, and determining said optimal channel information through said first recursive parameter.

11. The method as claimed in claim 8, prior to said step of performing decision feedback on said compensated information symbol, further including the step of:

providing said optimal channel information and said iteratively updated channel estimation information to an equalizer, updating a parameter of said equalizer in real time for performing channel compensation to said information symbol.

12. The method as claimed in claim 8, wherein said first recursive parameter, said second recursive parameter, and said interpolation number are all adjustable.

13. The method as claimed in claim 8, wherein said adaptive analysis is performed on one or more channel interference indexes.

14. The method as claimed in claim 13, wherein said one ore more channel interference indexes are the speed and the environmental signal-to-noise ratio (SNR) of said moving vehicle.

15. The method as claimed in claim 8, wherein providing iteratively updated channel estimation information to a next information symbol is accomplished through a least mean square (LMS) algorithm, and the iterative update of channel estimation information is performed on each information symbol once.

16. The method as claimed in claim 8, wherein said optimal channel information is adjusted by using a least mean square algorithm.

* * * * *